INVENTORS
WILLIAM H. AITKEN
ROBERT A. BROWN
FRANCIS G. DuPONT
BY
ATTORNEYS

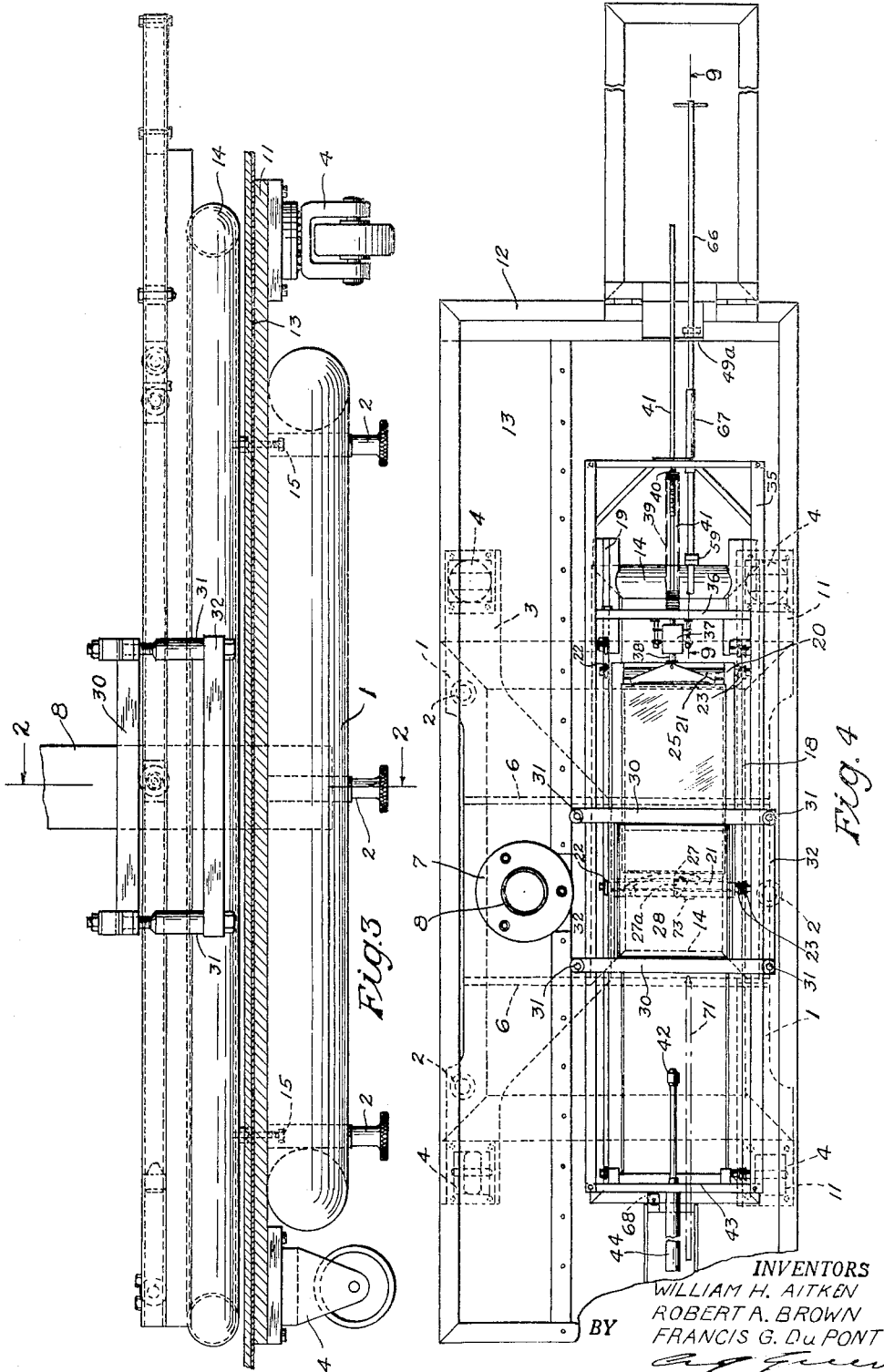

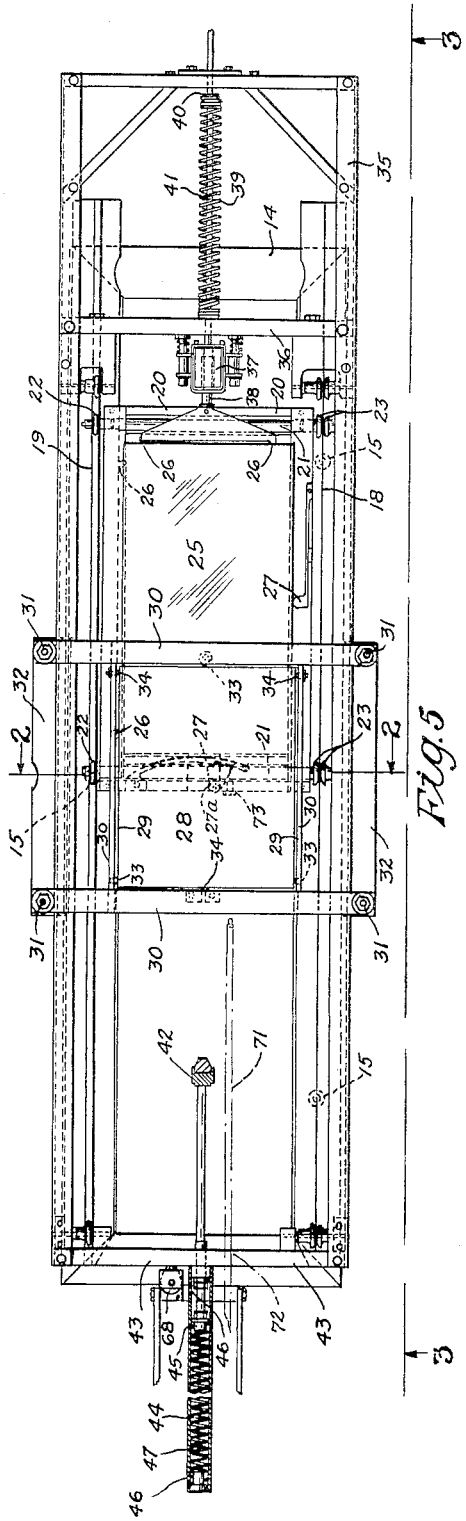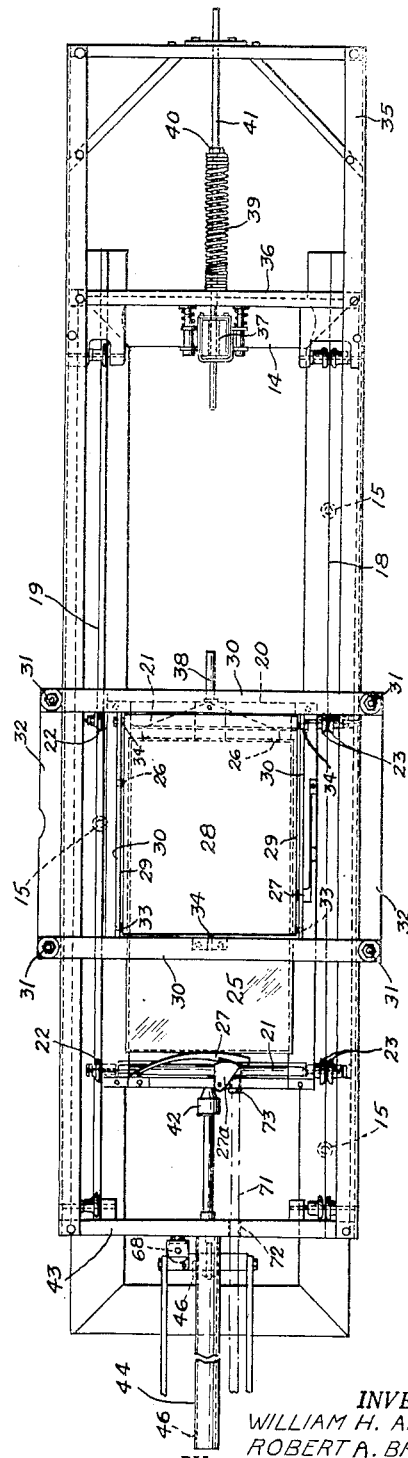

Nov. 1, 1955   W. H. AITKEN ET AL   2,722,157
SCANNING GRID CAMERA
Filed July 28, 1954   6 Sheets-Sheet 5

INVENTORS
WILLIAM H. AITKEN
ROBERT A. BROWN
FRANCIS G. DuPONT
BY
ATTORNEYS

Nov. 1, 1955  W. H. AITKEN ET AL  2,722,157
SCANNING GRID CAMERA
Filed July 28, 1954  6 Sheets-Sheet 6
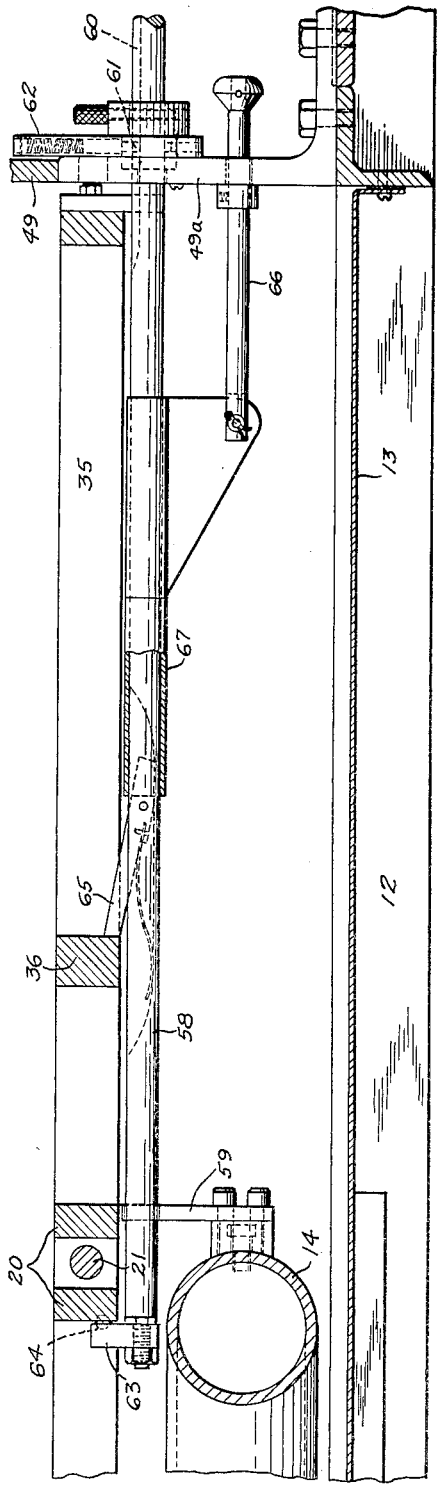
Fig.9
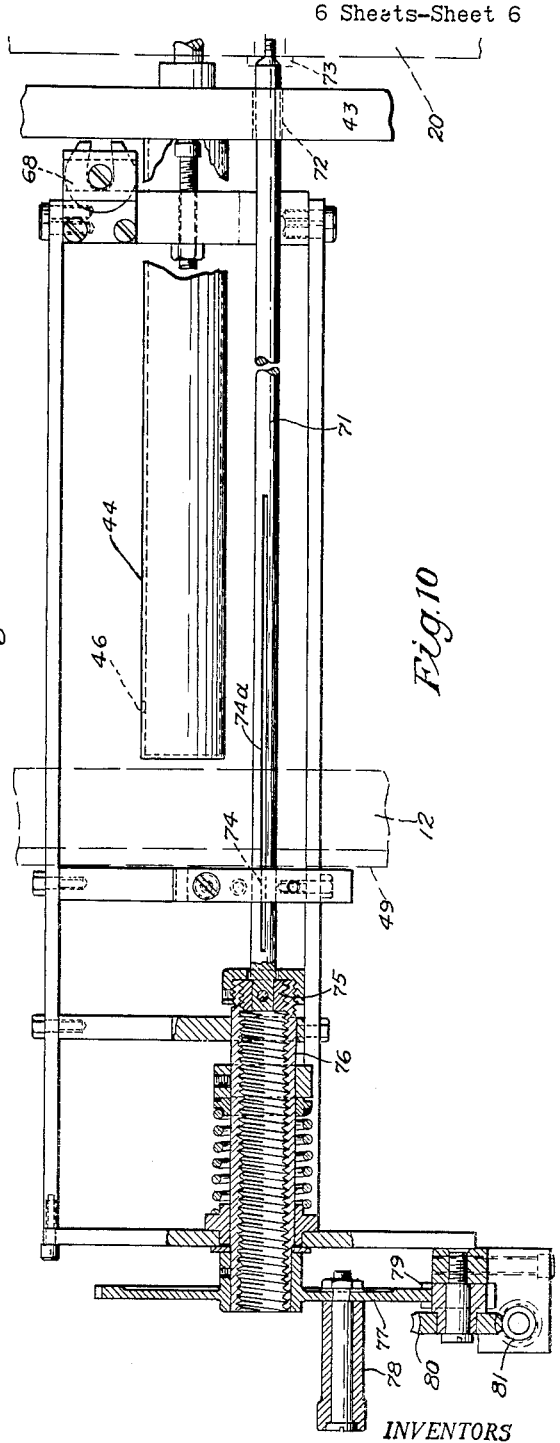
Fig.10
INVENTORS
WILLIAM H. AITKEN
ROBERT A. BROWN
FRANCIS G. DuPONT
BY
ATTORNEYS

2,722,157

SCANNING GRID CAMERA

William H. Aitken and Robert A. Brown, Milford, and Francis G. du Pont, Fairfield, Conn., assignors to Remington Arms Company, Inc., Bridgeport, Conn., a corporation of Delaware Application July 28, 1954, Serial No. 446,366

18 Claims. (Cl. 88—16)

This invention relates to a camera and more particularly to a camera in which a moving or stationary object is photographed through a grid or screen, the grid and the light sensitive material being in relative motion during the exposure interval.

The basic construction of such a device is shown in the patent to Kanolt, No. 1,260,682, and the application of these principles to various display devices was proposed by Richard Engelken. The application of these principles to high speed motion picture photography was further developed after Mr. Engelken's death by the Eastman Kodak Company, reference being made to papers by Fordyce E. Tuttle appearing at pages 25 and 36 of volume 2, "High Speed Photography," presented by the Journal of the Society of Motion Picture Engineers in November, 1949. Eastman Kodak's developments are illustrated in two embodiments as shown in the patents to F. E. Tuttle et al., Nos. 2,578,327 and 2,596,740.

In systems of this kind the extent of the exposure must be limited to prevent multiple over-exposure of the sensitized material by the continuing motion of the scanning grid. In the prior art as exemplified by Tuttle et al., this control has been provided by capping shutters associated with the scanning grid. We prefer to control the length of the exposure interval by controlling the length of time during which the subject is illuminated. For this purpose, we prefer to utilize the Square Wave Light Pulse Illuminator disclosed in the patent application of R. A. Brown and F. G. du Pont, Serial Number 306,635, filed August 27, 1952, now Patent No. 2,679,618, patented May 25, 1954. The construction and operation of the camera is thereby materially simplified.

In a system of this kind the light sensitive material or the grid is necessarily in motion during the exposure interval. The acceleration and deceleration accompanying the starting and stopping of this motion must not be allowed to react upon any other element of the camera in a way which can introduce vibration into the system and thereby disturb the accuracy of the record.

An important object of our invention has been the production of a scanning system which throughout the period of scanning motion is substantially isolated, in regard to the transmission of mechanical forces, from the other elements of the photographic system.

We prefer to accomplish this objective by accelerating our scanning system by a force reacting on a frame which is itself accelerated in the opposite direction. If the two moving elements are both supported for relatively free motion with respect to the camera frame, their acceleration in opposite directions can be accomplished without substantial reaction upon the camera frame. We contemplate that the scanning grid can be supported upon one such moving element and the sensitized material on the other of such elements or alternatively that either the scanning grid or sensitized material be stationary and the other supported on a moving element which is accelerated with respect to an oppositely moving frame functioning solely as a counterweight.

The same principles apply to scanning with relative rotary motion and to scanning with relative rectilinear motion. For simplicity, we prefer to utilize a rectilinear motion and to mount our scanning grid stationary in the focal plane of the lens. The sensitized material we prefer to mount on a carriage which may be translated relative to the grid and substantially in face-to-face contact therewith, accelerating the carriage for the sensitized material relative to a counterweight carriage which is itself accelerated in the opposite direction. Although such a scanning system may be supported to reciprocate horizontally in a vertical plane, we prefer for simplicity to have the system reciprocate horizontally, with the scanning grid and sensitized material lying in a horizontal plane. This disposition of the scanning grid and sensitized film, of course, requires that the camera lens look either straight up or straight down, but this unconventional arrangement is an advantage for many purposes and a good quality front surface plane mirror can be employed to secure pictures in the conventional horizontal direction.

Precise mechanical motion is required for driving the scanning system and the performance of the camera is largely determined by the action of the scanning mechanism. Motion in the scanning system involves acceleration of the mechanism to the predetermined scanning velocity, scanning at uniform velocity for a sufficient interval to permit synchronization with the subject event, deceleration of the system, and rebound control. This action may, of course, be accomplished in many ways each with its own particular characteristic. In attempting to review the principal means for scanning drive, this discussion will be confined to those applicable for translation of a counterbalanced rectilinear motion scanning system. Among various prime movers which might be used to drive the scanning system, those most practical from the general standpoint are mechanical springs, compressed air cylinders, ballistic cartridges, electromagnets, and electric motors.

The mechanical spring is the simplest mechanism for acceleration. Springs have an advantage over other devices in that when manually cocked no external power is required. The performance of the spring is of course constant, and various rates of acceleration are easily obtained with simple mechanical adjustments; and while the acceleration is not uniform, an advantage is gained in the diminishing force which subdues vibration. The initial force, on the other hand, is but moderately higher, presenting no difficulty in the release mechanism or by higher initial acceleration. Mechanical springs may be coupled to provide acceleration by many schemes, such as direct interconnection between the plate holder and the counterweight or by racks and pinion, screws, or gears, connected for rotation. Deceleration and rebound may be absorbed by separate springs or by a system arranged to utilize the accelerating spring.

The pneumatic cylinder may be used to provide an accelerating force similar to that of the spring, and while not as simple as the spring, the mechanism of a compressed air driven accelerator might well be chosen to drive a scanning camera. Auxiliary power is not required, since an adequate supply of compressed air may be readily provided by a manually operated pump, although auxiliary equipment consisting of pump, receiver, gage and valve is obviously required. An air operated system has the advantage over a spring in that the potential of the system may be varied by the pressure selected, with the convenience that the pressure gage will indicate exactly what acceleration is to be expected. And, as with the spring, the pneumatic cylinder lends itself to schemes which provide for deceleration and rebound. However, the pneumatic cylinder must necessarily present a widely varying acceleration characterized by high initial force, which contributes to vibration, and introduces additional problems in the design of the photographic plate carriage.

The ballistic cartridge may also be used as means for producing the scanning motion, and in such application would have performance characteristics similar to those of the pneumatic accelerator. With regard to dependance upon outside power sources, cartridge power is inherently simple. On the other hand, special problems are introduced, such as explosive vibration and smoke disposal.

The electromagnet presents another basic means for energizing the scanning device. The solenoid is one type of magnet suitable for practical adaptation, and with the proper electrical impulses is capable of both acceleration and deceleration of the mechanism at various rates. In addition to more complex controls an external source of electrical energy is required. The electric motor is ideally suitable as a scanning drive, and may be employed for this purpose in a number of different schemes. Pinion gears on the motor shaft might engage racks connected respectively to the plate holder and its counterweight; or some screws might be arranged in a similar manner to translate nuts, connected with the mechanism. With a torque motor connected directly to the mechanism, scanning translation would become initiated upon application of the electric power, while the rate of acceleration could be controlled by the motor current. Thus, by appropriate control of the scanning motor power, the scanning system may be accelerated to the desired rate of speed, held at constant velocity during the synchronized scanning interval, then decelerated by motor reversal, and returned to the starting position. Similar motion would be readily produced by systems employing continuously revolving motors having appropriate inertia flywheels, and connecting by means of a magnetic or mechanical clutch. There are, of course, other useful schemes, for instance, one in which the motor would be mounted upon a moving element of the scanning system, such as the counterweight, with connecting mechanism extending directly to the plate holder. Because the accelerating force produced by a torque motor is proportional to the applied motor current, this type of drive permits the widest range of control.

A manually cocked spring was selected to drive the exemplary camera presented here; and while less versatile than an electric motor, it permits the design of a simplified mechanism, which requires no auxiliary power.

The exact nature of a preferred embodiment of our invention as well as other objects and advantages thereof will become apparent from consideration of the following specification referring to the attached drawings in which:

Fig. 3 is a partial vertical cross-sectional view on the line 3—3 of Figs. 2 and 5.

Fig. 4 is an overall plan view of the assembly showing the scanning mechanism in a cocked position.

Fig. 5 is an enlarged horizontal sectional view of the scanning system taken on the line 5—5 of Fig. 2, showing the scanning mechanism in a cocked position ready for a scanning movement.

Fig. 6 is a view similar to Fig. 5, showing the scanning mechanism in the position of greatest displacement during scanning movement.

Fig. 9 is a partial vertical sectional view on the line 9—9 of Fig. 4. The carriage positioning mechanism is in operative position and the carriages are drawn back into position to tension the accelerator spring.

Fig. 10 is a partial horizontal sectional view in the same plane as Figs. 5 and 6, showing the micrometer viewing mechanism in operative position. The position of the counterweight carriage corresponds to that shown in Fig. 5 but the position of the plate carriage is intermediate the two positions shown in Figs. 5 and 6.

Frame

Figure 1:
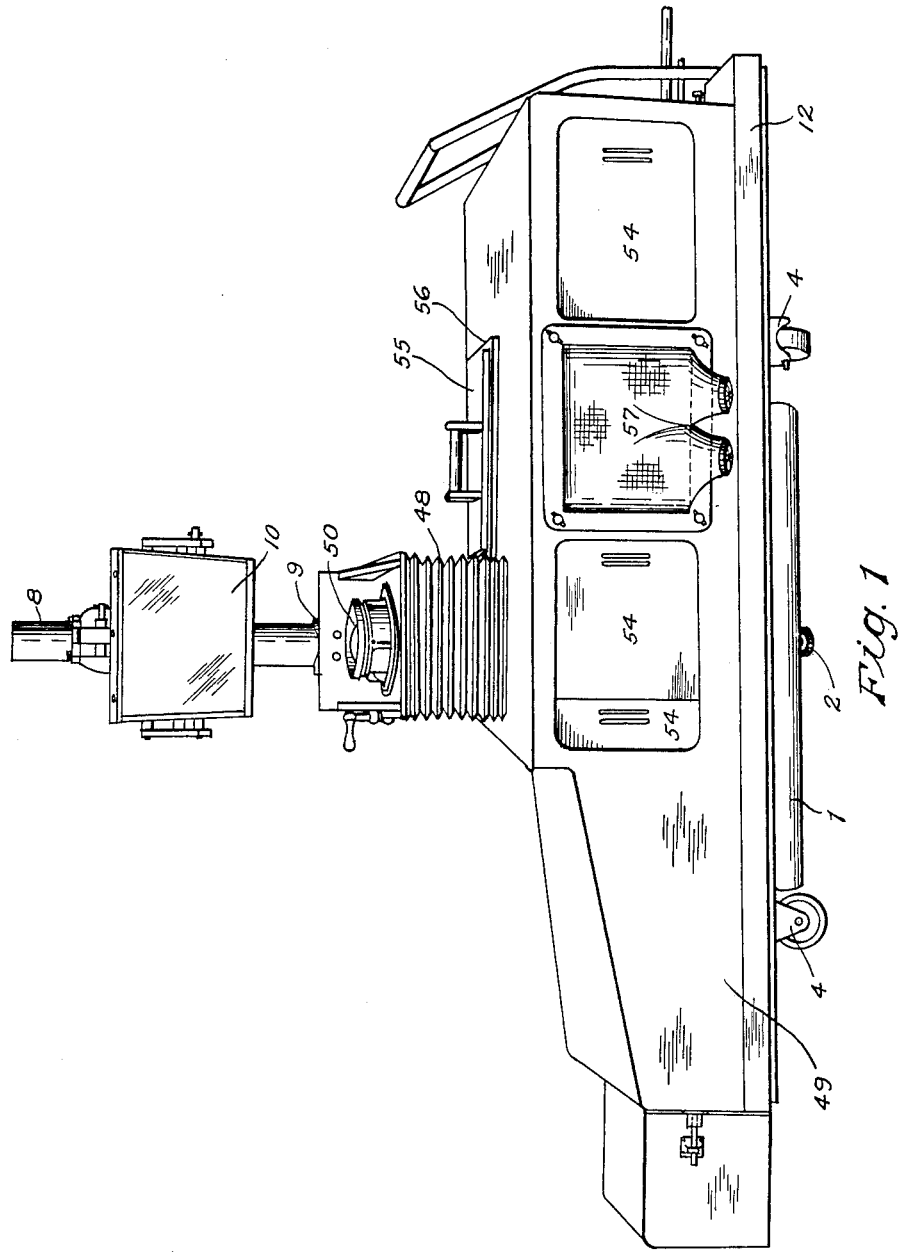
Fig. 1 is a perspective view of the complete camera.
Figure 2:
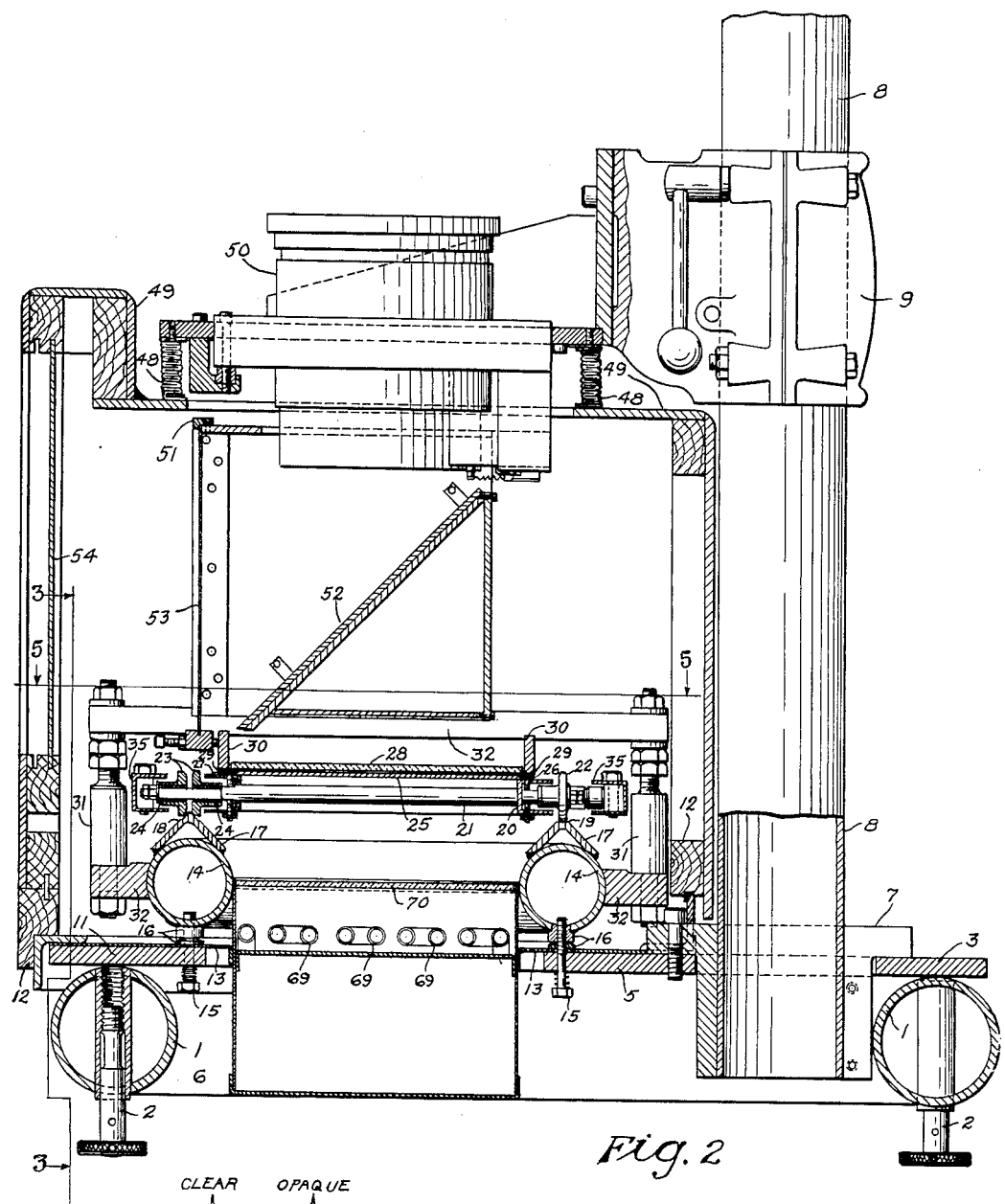
Fig. 2 is a vertical, longitudinal sectional view taken on the line 2—2 of Figs. 3 and 5.

Referring to the drawings by characters of reference, it will be seen that the base of the camera consists of a rigid rectangular frame 1 constructed of steel tubing with welded beveled corners. Three adjustable screw jacks 2 are provided to provide for rigid level support of the camera frame on any reasonably level floor. Welded to the top surface of the frame 1 is a bracket 3 of heavy steel plate which extends longitudinally beyond the ends of the pipe frame 1 and provides for mounting a pair of casters 4. A wider central portion 5 of the bracket is stiffened by a pair of ribs 6 welded to the bracket and to the frame 1 which is spanned by the ribs. This central portion 5 of the bracket supports a flange 7 which, in turn, supports a steel column 8 extending vertically to support the lens bracket 9 and mirror 10.

Smaller brackets 11 are also welded to the opposite side of the frame 1 and each extends longitudinally beyond the ends of the frame to support another pair of casters 4. These brackets are also welded to the ribs 6 so that the assembly of the pipe frame and the three brackets forms a frame of great strength and rigidity.

An angle iron extension to this frame supports a horizontal wooden frame 12 which serves as a base for a light-tight housing surrounding the working mechanism of the camera. A sheet metal deck 13 forms a light-tight bottom for all of the bottom of the camera within the frame 12.

Scanning system

The scanning system includes the major part of the working mechanism of the camera and to insure that irregularities in the support from the floor do not distort the scanning system, an independent sub-frame 14 is provided which is supported at three spaced locations from the wide portion 5 of the bracket 3 and from the brackets 11. Spring-loaded bolts 15 and shim-like spacers 16 isolate the two frames while providing a degree of adjustment sufficient to establish a perpendicular relation between the axis of the column 8 and the plane of the scanning mechanism supported by the sub-frame 14.

Like the main frame 1, the sub-frame 14 is composed of steel tubing with welded bevel corners to insure maximum rigidity and resistance to torsional displacements. The scanning system is supported on tracks formed on the outside corner of a pair of parallel steel angles 17 welded to the longitudinal members of the sub-frame in inverted V position. Parallel working surfaces are carefully machined on these angles defining an inverted V track 18 and a flat track 19 in the manner of lathe bed ways.

The scanning system supported on these tracks consists essentially of two carriages which roll on these tracks beneath a fixed scanning grid. One of these carriages supports the photographic plate for translation beneath the scanning grid and the other provides a counterweight and supports the mechanism for accelerating and decelerating the photographic plate.

The plate carriage 20 is preferably constructed of aluminum channel and copiously perforated to reduce weight. At each end of the carriage an axle 21 is supported and projects laterally above the tracks 18 and 19. On that side of the carriage 20 which is supported by the flat track 19 each axle is fitted with a single wheel 22 which rolls on the flat track. On the opposite side a pair of spaced wheels 23 straddle the vertex of the inverted V track 18. Ball thrust bearings 24 are provided to take up end thrust resulting from the wedging apart of the wheels 23 by the track 18. By this mounting all but two degrees of freedom are constrained and the carriage follows the track exactly.

The photographic plate 25 rests on top of the plate carriage 20 being supported by about 1/8" contact under all edges. A plurality of fixed stops 26 and spring-loaded clamps 27 are provided to bear on the edges of the plate to locate the plate and hold it securely in position without permitting any obstruction to project above the face of the photographic plate. The force of gravity and the frictional engagement of the clamps combine to hold the plate down. A cam lock 27a engages one of the clamps 27 to provide a positive lock against displacement of the plate as the carriage is accelerated and decelerated. The unobstructed opening beneath the photographic plate makes it possible to illuminate a developed plate from beneath by means to be later described for the purpose of analyzing the photographic record.

The scanning grid 28 (shown magnified in Fig. 11) bridges over the central section of the tracks and the plate carriage passes beneath it during scanning, it being desirable that the plate and the grid be as nearly as possible in face-to-face contact. To this end the scanning grid is supported on thin flanges 29 paralleling the tracks and laterally just outside the path traced by the photographic plate on the carriage 20. These flanges 29 are mounted on a frame 30 which is supported on four vertical studs 31 secured to lugs 32 welded to the tubular subframe 14. Threaded adjustments on the studs permit adjustment of the position of the scanning grid frame to provide minimum clearance between grid and photographic plate.

Fixed stops 33 and adjustable stops 34 are provided to locate the scanning grid in a horizontal plane, vertical adjustment being provided by the studs 31.

As previously noted, the plate carriage is accelerated and decelerated relative to a counterweight carriage to avoid the transmission of distorting stresses to the remainder of the system. To save space and track length the counterweight is provided by a counterweight carriage 35 which is a rectangular frame supported on the track by a system of wheels similar to those employed to support the plate carriage 20. The frame of the counterweight carriage is wider than the plate carriage and is long enough to accommodate the entire motion of the plate carriage within the clear space surrounded by the counterweight carriage frame.

A cross member 36 is provided on the counterweight carriage and to this cross member there is secured a solenoid coil 37 which receives an armature bar 38 mounted on the plate carriage 20. With the solenoid energized the plate carriage and counterweight carriage are held in the relationship shown in Fig. 5. The force for accelerating the plate carriage is derived from a spring 39 which is secured at one end to the cross member 36 and at the other end to a fitting 40 on the shank of a plunger 41 which extends through the spring and into engagement with the end of the armature bar 38. So long as the solenoid is energized the spring may be held cocked and the two carriages will retain the relative positions shown in Fig. 5. When the solenoid is de-energized the spring contracts and the plunger 41 ejects the armature bar 38 from the solenoid, propelling the plate carriage beneath the scanning grid. At the same time, the reaction to the propulsion of the plate carriage acts upon the counterweight carriage which is propelled in the opposite direction. After the spring has contracted to its normal height as shown in Fig. 6, it decelerates against its own resistance and the two carriages move independently for the next portion of their movement.

The plate carriage and counterweight carriage are decelerated by engagement with the plunger 42 of a pneumatic buffer supported on a cross bar 43 on the counterweight carriage. The buffer comprises a closed cylinder 44 enclosing a piston 45. Orifices 46 are provided in the cylinder and it encloses a relatively light return spring 47. As the plate carriage engages the plunger 42, the air within the cylinder 44 and the spring 47 are compressed. Rebound is prevented by the throttling effect upon the air passing through the orifices 46. The plate carriage and the counterweight carriage come to rest in relative positions near that in which the plate carriage first engaged the buffer.

*Camera housing and lens mount*

As previously noted, a steel column 8 is supported vertically on the frame and provides a mounting for the lens bracket 9 and mirror 10. The lens bracket is joined by the usual bellows 48 to a casing 49 which is mounted on the horizontal frame 12. In a preferred embodiment, the column is that of a conventional drill press and the lens bracket is mounted thereon by the rack and pinion mechanism which would ordinarily be employed to position a drill press table. Obviously, any other positioning mechanism could be employed which is capable of fine adjustment and rigid support.

The lens 50 may conveniently be a modified aerial camera type of lens provided with an electrical solenoid for opening the internal shutter mechanism and a spring to close the shutter. Although such a shutter is not concerned with the actual timing of the exposure, it is convenient to use it as a safety capping shutter. Such a safety shutter is conveniently operated to open the lens simultaneously with the initiation of scanning movement and closed just after completion of the scanning movement and before rebound takes place. The electrical control of the capping shutter and release solenoid for the plate carriage will be later discussed.

The field of view of the camera, it will be noted, is vertically upward, which is quite useful in many fields of ballistic research. To adapt the camera to other uses, the mirror 10 is suspended from a swivelling yoke and bracket adjustably mounted on the column 8. Adjustments may be provided to direct the camera view through a horizontal arc of about 270 degrees and a vertical arc of about 45 degrees within height limits imposed by the vertical position of the lens and the height of the column. Obviously, the mirror should be an optically flat, front surface mirror of good quality to avoid distortion of the image.

To facilitate focusing of the camera, a viewing cell 51 is provided which can be temporarily positioned on the rails supporting the scanning grid. This viewing cell comprises a mirror 52 positioned at 45 degrees to the optical axis of the lens and a ground glass screen 53 which occupies the same relative optical position as the focal plane at the interface of scanning grid and photographic plate. By the use of this viewing cell it is possible to accurately focus the lens and determine the field of view. After use, the viewing cell may be removed through one of the doors 54 provided in the camera housing or it may be stored on a rack, not shown, within the camera housing but outside the field of view of the lens.

A plate magazine 55 is provided in the form of a light-tight box which may be inserted through a port 56 in the top of the camera housing 49. Light-tight sleeves 57 are provided in the front wall of the camera housing and permit manual opening of the plate magazine and transfer of plates between the magazine and plate carriage. The plate magazine is not shown in detail in any of the sectional views since its construction is not critical. All that is required is a light-tight box which may be loaded in a darkroom and inserted into the camera. The box should provide suitable racks for holding plates and be capable of being opened and closed for plate transfer while within the camera.

*Carriage positioning mechanism*

After the camera has completed a scanning cycle, it is necessary to re-tension the accelerating spring 39 and to return the carriages to their proper starting positions. Referring specifically to Fig. 9 for details and to Fig. 4 for general location in the assembly, it may be seen that this function is performed by a manipulator rod 58 which is mounted for reciprocatory movement through the end of the camera housing, being guided within the housing by a bearing 59 engaging about ¾ of the circumference of the rod. A longitudinal keyway 60 in the manipulator rod receives a key 61 in a lever 62 which is rotatable in the end of the camera housing. A detent is provided which releasably retains the lever 62 in a vertical position or another position rotationally displaced therefrom by 90°.

The inner end of the manipulator rod is provided with a finger 63 which points in the same direction as the lever 62 and which may accordingly be positioned to extend vertically upward from the axis of the manipulator rod or to lie horizontally in the same horizontal plane as the rod. To reposition the plate carriage the lever 62 and finger 63 are horizontally disposed and the manipulator rod inserted into the camera housing to the maximum degree. The lever and finger are then turned vertically upward and the manipulator rod withdrawn. At some point in the movement of withdrawal the finger 63 will engage a detent ball 64 on the plate carriage and further movement of the manipulator will bring the carriage along. After further withdrawal, the armature bar 38 (Fig. 4) on the plate carriage will engage the plunger 41 on the counterweight carriage, and when the counterweight carriage itself engages the plate 49a supported on the frame at the end of the camera housing 49 the spring 39 will be tensioned. As the spring reaches its maximum extension a latch 65 on the manipulator rod springs up behind the cross member 36 on the counterweight carriage to secure the spring in cocked position. If desired, the latch may be manually released by holding the manipulator rod and pushing in on the release rod 66, which moves a sleeve 67 along the manipulator rod to depress the latch.

With the spring thus cocked, the counterweight carriage may be returned to its starting position at the opposite end of the track, where it is lightly retained by engagement with the magnet 68 (Figs. 6 and 10). When the solenoid coil 37 is energized it will retain the armature bar 38, taking over the function of holding the spring cocked. The manipulator rod may then be turned to disengage the finger and the latch from the carriages and the manipulator rod withdrawn to a position where it will not interfere with carriage movement.

For viewing the photogrgaphic record, a developed plate is returned to the plate carriage and moved indexably beneath the scanning grid, being illuminated during such movement by light from the gaseous tube or "cold" light 69 supported in the bottom 13 of the camera housing beneath the plate carriage and scanning grid. An opal or other diffusing glass 70 is mounted between the light and the plate carriage.

Since the entire record to be analyzed is taken in a very small portion of the scanning movement (e. g., .030 inch with a scanning grid of .001" slits spaced by .030 inch), it is apparent that the motion of the plate carriage must be precisely controlled while the record is being analyzed, particularly if it is being rephotographed or transposed to conventional motion picture film for exhibition in ordinary projectors.

Referring specifically to Fig. 10, it may be seen that the plate carriage is arranged to be driven by an elongated steel rod 71 which in use is inserted through a hole in the end of the camera housing and passing through a hole 72 in the counterweight carriage 35 is to be secured to a nut 73 fixed in the end of the plate carriage 20. A manually releasable detent 74 is provided to engage in a slot 74a in the rod 71 to prevent turning thereof. Integral with the end of the driving rod 71 is a short floating screw 75 which is engaged in an elongated bronze nut 76 suitably mounted to minimize end play and provided with a handwheel 77 and crank 78 for coarse adjustment. The periphery of the handwheel may be provided with gear teeth with which a pinion 79 may be engaged, the pinion being driven by a worm wheel 80 and worm gear 81. Suitably, the ratio through the gears and the screw may be such that one complete turn of the worm gear 81 will move the plate carriage .001 inch or one slit width with a typical scanning grid such as that illustrated in Fig. 11. Obviously, the worm gear may be driven by any suitable power source in synchronism with the operation of an animating camera to transpose the scanning grid camera record from the plate to conventional motion picture film for exhibition in conventional projectors.

Electrical system

Figure 7:
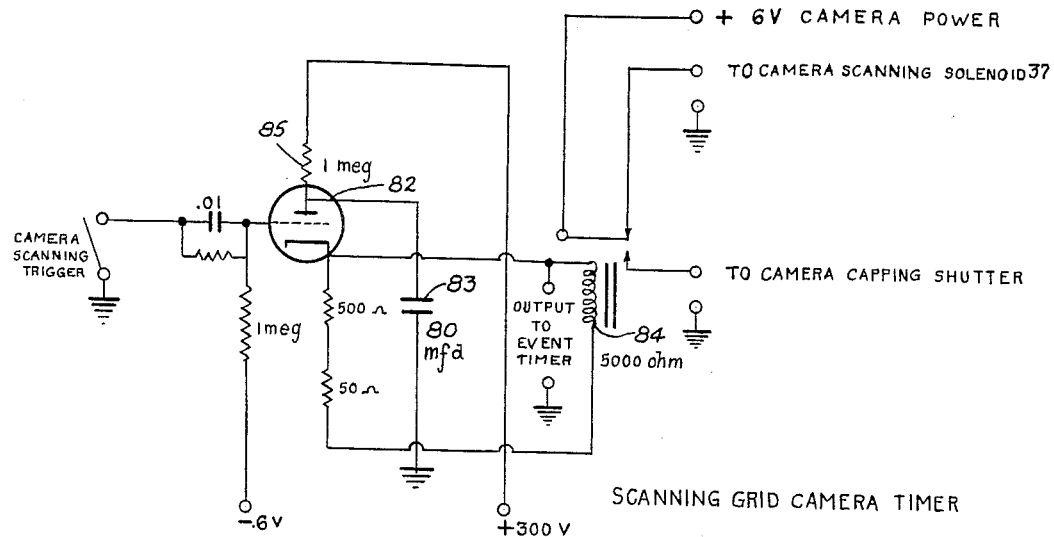
Fig. 7 is a schematic electrical diagram for the camera control circuit.

Fig. 7 shows in schematic form the electrical circuit used to control the operation of the scanning solenoid 37 and the capping shutter associated with the lens 50. It will be recalled that the camera is held in a position of readiness for scanning by the maintenance of current through the solenoid 37. Similarly, the capping shutter is opened by the energizing of a solenoid and closed by a spring. Thus, to effect the operation of the camera it is necessary to interrupt the flow of current to the solenoid 37 to release the plate carriage and for a controlled interval of time to apply current to the capping shutter solenoid to hold the shutter open. For convenience, these operations are initiated by an electrical trigger pulse or by the closing of an electrical contact. After a suitable time delay the initiating trigger pulse may be used to initiate the event to be photographed and to trigger the square wave light pulse generator which provides the time-controlled illumination for making the photographic record, or alternatively the circuit shown in Fig. 7 may itself provide a trigger pulse to initiate these subsequent events.

Referring to Fig. 7 by characters of reference, it will be seen that we have provided a grid controlled hot cathode arc tube 82 which is normally non-conducting because its grid is maintained at a 6-volt negative bias. Shunted across this tube is a large capacitor 83 which is normally charged to the full voltage of the plate voltage supply for the tube 82. When the arc tube 82 is fired by grounding the input terminal or applying a positive voltage pulse thereto, the capacitor discharges rapidly through the tube. The cathode circuit of the tube may be arranged so that all or only part of the discharge current passes through a relay coil 84 to operate a single pole double throw contact to break a normally closed circuit and close a normally open circuit. The switching action of the relay interrupts the supply of current from a 6 volt battery or battery eliminator to the plate carriage holding solenoid 37, thus releasing the plate carriage for a scanning movement. Substantially simultaneously current is supplied from the 6 volt source to the solenoid which opens the capping shutter in the lens 50 and holds it open against a closing spring as long as current flow is maintained in the relay coil 84.

With the component values shown on the diagram the capacitor 83 will supply current to hold the relay out of its normal position for about ½ second and as the discharge of the capacitor is completed, the arc tube is extinguished. Before the capacitor can be recharged through the resistor 85, the grid will have regained control and the tube will not fire again. The timing is, of course, readily adjustable by varying either the capacity or the resistance in the discharge circuit and should be picked to hold the capping shutter open for the complete scanning movement. Although the plate carriage release solenoid is re-energized when the capping shutter is permitted to close, this is immaterial for the plate carriage is by then too far distant to be affected by the solenoid.

Conveniently, means may be provided to derive a positive trigger pulse from the cathode of the arc tube. Such a pulse is useful as a means of initiating, through suitable time delay networks if needed, the event to be photographed and the square wave light pulse generator which provides the illumination for the photograph. Such a connection is identified in Fig. 7 as "Output to event timer."

*Specific example*

Figure 11:
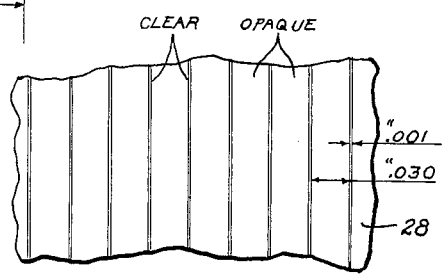
Fig. 11 is a magnified view of a portion of the scanning grid.

In an exemplary embodiment of a camera constructed according to this invention, the scanning grid is an 8"×10" plate provided with transparent slits of .001" width spaced apart by .030", these alternating slits and opaque portions covering the entire surface of the plate as fragmentarily illustrated in Fig. 11. The photographically sensitive plate which is translated beneath the scanning grid is 7¾"×14" in size and the clearance between grid and photographic plate is adjusted to the minimum consistent with the avoidance of actual contact. Although the scanning accelerator springs may be made interchangeable to secure different scanning rates, we have found it convenient to operate the plate carriage at a rate of 100 inches per second during the actual scanning interval, such a rate being also capable of expression as 100,000 slit widths per second. As noted by other experimenters, motion is apparent in scanning grid camera records with relative movement of less than one slit width so it is conservative to express this scanning rate as being equivalent to more than 100,000 frames of conventional movies per second, it being possible to scan 30 slit widths or obtain 30 discrete exposures before double exposures are obtained.

Figure 8:
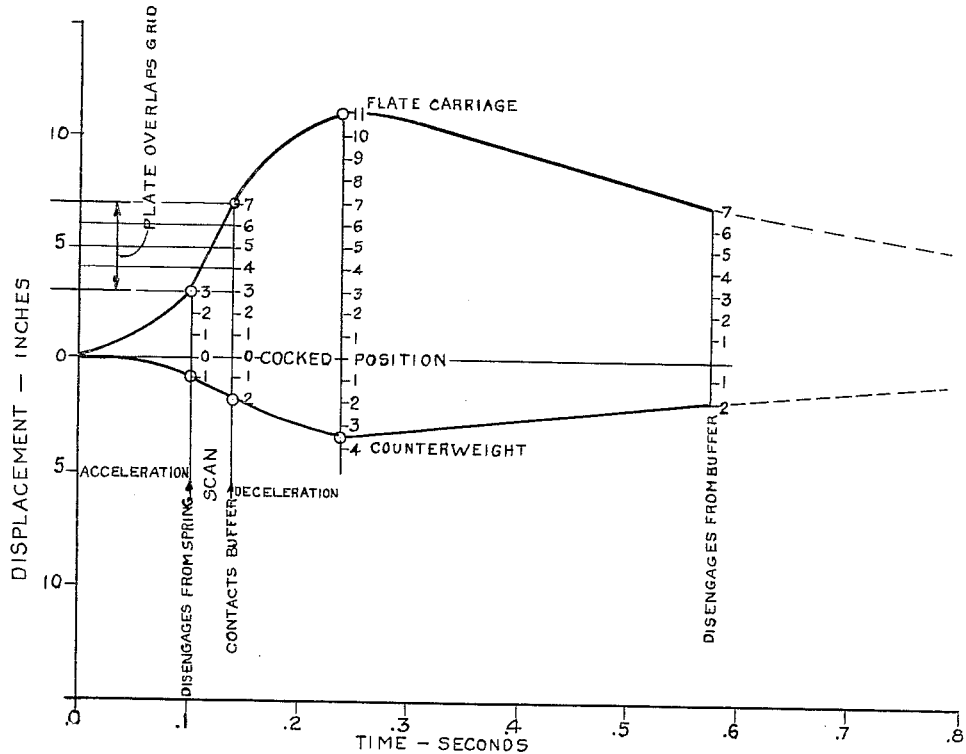
Fig. 8 is a graphical diagram illustrating the relative displacements of the elements of the scanning system during a scanning cycle.

Fig. 8 is a displacement time diagram showing the relative positions of the plate carriage and the counterweight carriage during a scanning cycle. It will be noted that the two carriages are held together in their cocked or initial position by the solenoid 37. When current in the solenoid is interrupted, the two carriages are accelerated in opposite directions, the plate carriage at a higher rate because of its smaller mass. After about 3" of movement the plate carriage will overlap the scanning grid and will be in free movement as it will have disengaged from the accelerating spring. This free movement will continue for at least 4", during which time the plate will be beneath the scanning grid, and shortly after the plate begins to pass out from beneath the grid deceleration will commence as the plate carriage engages the pneumatic buffer at the opposite end of the counterweight carriage.

The actual photographic record may be made at any time during the four inches of relatively free scanning movement and actually requires only .030" of that movement.

Engagement of the buffer occurs when plate carriage and counterweight carriage have moved relative to each other about nine inches and the buffer will ordinarily be compressed 5" to 6" before it brings the carriages to rest as indicated by the inflection points on the time displacement curves. There is a relatively slow return movement under the urging of the light spring in the buffer but the rate is so low that ordinarily the carriages will drift to a stop soon after the buffer has returned to its position of maximum extension.

*Review of operation*

Assuming that the plate carriage and counterweight carriage are in the indefinite positions in which they come to rest after the taking of a picture, the camera would be prepared for taking another picture by first turning the lever 62 on the manipulator rod 58 to a horizontal position and then pushing the manipulator rod into the camera housing to the maximum position. The lever 62 is then positioned vertically which turns the finger 63 up in back of the ball 64 on the plate carriage and the manipulator rod is withdrawn.

The return movement of the manipulator rod brings the plate carriage along and when the counterweight carriage is stopped by engagement with the plate 49a, the accelerating spring 39 is tensioned. Engagement of the latch 65 retains the spring and the manipulator rod may be pushed in again to return the counterweight carriage to its starting position at the opposite end of the frame where it is lightly retained by the magnet 68. The energization of the solenoid coil 37 then takes over the function of the latch 65 and the manipulator rod may be withdrawn to a position clear of the scanning movement.

Assuming that the camera has been previously focussed to cover the desired field of view and the viewing cell withdrawn, a plate may now be withdrawn from the plate magazine and loaded into the plate carriage. Incidentally, it may be mentioned that it is desirable to store the plates in the camera long enough to reach equilibrium temperature with the scanning grid to avoid registry difficulties when the plates are viewed or rephotographed. This completes the preparation of the camera for taking a picture.

In a typical application of photographing the impact of a caliber .30–'06 bullet on a frangible target, a scanning rate of 90 inches per second or 90,000 slit images per second was selected which requires for one sequence of 30 slit widths a time of .000333 second. An illumination interval of .000350 second was selected for the square wave light pulse generator which resulted in only a slight double exposure interval. With this rate of acceleration the plate carriage reached the midpoint of its four inch travel through the scanning range in an average time of .136 second after release of the solenoid coil 37. The gun was electrically fired and there was an average time of .050 second between the actuation of the electrical firing mechanism and the arrival of the bullet in the area to be pictured. A pre-set interval timer was therefore arranged to be actuated by the positive pulse at the cathode of the arc tube 82 and to generate a pulse for firing the gun after a delay of .086 second, thus timing the bullet to arrive in the target area at substantially the midpoint of the scanning movement. A light beam projected to a photocell was arranged to be interrupted by the arrival of the bullet at the edge of the image area and a known pulse circuit provided to generate a trigger pulse for starting the square wave light pulse generator in response to the interruption of the light beam.

With these arrangements, the camera operation was initiated by closing a switch grounding the grid of the arc tube 82, thus releasing the plate carriage and opening the shutter in the lens 50. After .086 second, the gun was fired and after .050 second the bullet reached the edge of the target area and photoelectrically tripped the square wave light pulse generator, which provided light of photographically effective intensity for .00035 second and then abruptly terminated the light. At a bullet speed of 2700 feet per second, this duration of illumination produced a photographic record of the travel of the bullet along approximately 8 inches of trajectory, approximately .00002 second of the scanning interval being doubly exposed due to the fact that the square wave light pulse persisted for more than 30 slit widths of scanning movement.

After development of the plate it may be returned to the plate carriage and viewed by light transmitted from the tube light 69, although a detailed analysis or transposition to other film should not be undertaken until it is certain that temperatures have been equalized at the level at which the picture was taken. The plate may be developed as a negative and then rephotographed to yield a positive print with a minimum of handling, or it may be viewed or projected as a negative. In practice, a modified 16 mm. motion picture camera is driven slowly by a geared electric motor so as to make consecutive single frame exposures of several seconds each while the plate carriage is advanced micrometrically with respect to the grid. When such a motion picture film is processed without reversal, it displays the analyzed plate in the desired positive phase but the record is complicated by the fact that the dark field of the opaque portion of the grid also appears in opposite phase and is now transparent. In projection on a screen such an image is presented as narrow bands of positive detail from the analyzed plate in a brightly illuminated field which greatly reduces the apparent contrast and detail.

Two remedies are available to reduce the effect of or to eliminate this white light background. In one of these methods the copying camera objective lens is deliberately de-focused or set at a reduced image distance such that the grid aperture images become broadened to cover the intervening space. Necessarily, some reduction in image detail is involved, particularly in a direction parallel to the grid aperture slits but the details lost are for the most part finer than may be resolved on 16 mm. motion picture film. Since almost all of the light from the projected image then carries picture information and the spurious white light is diffused throughout the image field, the projected picture conveys the original pictorial contrast and presents adequate detail for qualitative analysis of the original plate record.

A method of eliminating spurious white light requires reversal processing of the camera plates to present the information in positive phase followed by re-photographing on motion picture film and reversal processing of the motion picture film also. Although the photographic processing is more complicated, the pictures present the optimum situation of positive detail displayed in a dark field.

Scanning grids

Although the discussion thus far has dealt with an exemplary grid of .001 transparent slits spaced at .030" in an opaque field, it should not be presumed that this is the only grid which will work or that it is necessarily optimum for any purpose.

The blur due to subject motion in a photograph is directly proportional to the exposure time which in a scanning grid camera is a function of the scanning velocity and the width of the transparent slits of the grid. An optimum exposure time is one which reduces the blur of the image to such a degree that it is no greater than the detail which the system will resolve. For a camera scanning at the rate of 100 inches per second and equipped with a grid of .001 inch wide apertures spaced at .030 inch, the blur due to subject motion begins to be apparent at image velocities above 3000 inches per second. Thus, to photograph a full size image of a rifle bullet traveling 10 times that fast (30,000 inches or 2500 feet per second), a grid aperture of .0001 inch is indicated as optimum. In practice, however, the blur due to motion is uni-directional and of less importance than other defects in recorded detail so a grid aperture width of .0002 inch is probably as narrow as could be justified.

Obviously, a system of this kind is limited to taking pictures for a length of time equal to the translation of the plate over one grid aperture spacing. With the .001 inch aperture spaced .030 inch, this compares nominally to a sequence of 30 discrete pictures while the .0002 inch aperture at the same spacing yields a nominal sequence of 150 discrete pictures.

The ability of a scanning system to store information on the time axis can be greatly increased by the application of a grid of hole apertures arrayed in a lattice fashion (e. g., .001 inch holes arranged at corners of .030 inch squares). By proper orientation of this type of grid, the adjacent apertures may be arranged to trace parallel paths which do not overlap or interfere with each other until a substantial portion of the plate area has been exposed.

Where a grid of slits of width $w$ spaced at intervals of $s$ is capable of $s/w$ discrete pictures, $$\left(\text{e. g. } \frac{.030}{.001} = 30\right)$$

a lattice of holes of width $w$ arranged at intervals of $s$ is capable of $(s/w)^2$ discrete pictures. Thus, a scanning lattice of .001 inch diameter holes arranged on a pattern of .030 inch centers is capable of a maximum of 900 discrete pictures.

Both types of grids are useful, the lattice grid extending the time axis and being generally preferable for conversion to conventional motion picture film. Slit grids, on the other hand, are more readily procurable at moderate cost and they yield the greatest amount of detail for short time intervals, although much of this detail in a direction parallel to the slits is lost in conversion to conventional motion picture film.

Although a specific embodiment has been presented here in considerable detail, it should be understood that we do not intend that our invention be construed as limited to that particular embodiment. For an exact definition upon the limits of our invention, reference should be made to the appended claims.

We claim:

1. In a scanning grid camera the combination comprising a photographic element carrying carriage arranged for translation in the focal plane of the camera, a counterweight carriage also arranged for translation in the focal plane of the camera, and a source of power for translating said first-mentioned carriage arranged to act thereon and react upon said counterweight carriage, said carriages being thereby accelerated in opposite directions.

2. In the combination described in claim 1, a shock absorbing buffer on said counterweight carriage arranged to be engaged by said photographic element carriage after a predetermined amount of relative translatory movement to decelerate both of said carriages.

3. The combination described in claim 2, said counterweight carriage being formed to define an elongated rectangular frame within which said photographic element carriage is received and has its entire translatory movement.

4. The combination described in claim 3, said carriages being supported for horizontal rectilinear movement.

5. The combination described in claim 4, said camera being arranged with a horizontal focal plane and the rectilinear movement of said carriages being confined to a horizontal plane.

6. A camera comprising in combination a horizontal base, a pair of parallel, longitudinally extending tracks supported from said base in a level, horizontal plane, a photographic element carrying carriage mounted on wheels received on said tracks for translatory movement longitudinally of the tracks, a counterweight carriage also mounted on wheels received on said tracks for translatory movement longitudinally of the tracks, and a source of power mounted on said counterweight carriage and acting on said photographic element carriage for translating said photographic element carriage, said carriages, by the action and reaction of said power source, being accelerated in opposite directions without substantial reaction on said base.

7. The camera described in claim 6, including a shock absorbing buffer mounted on said counterweight carriage in position to be engaged by said photographic element carriage after a predetermined amount of relative translatory movement of said carriages to decelerate both of said carriages without substantial reaction on said base.

8. The camera described in claim 7, said counterweight carriage being formed as an elongated rectangular frame laterally enclosing said photographic element carriage with sufficient clearance to permit the entire movement of said photographic element carriage to take place within the confines of said frame.

9. The camera described in claim 8, one of said tracks being formed to define a flat wheel engaging surface and the other of said tracks being formed to define an inverted V wheel engaging surface, said carriages being provided with single wheels rolling on the flat track and with pairs of spaced single wheels rolling on opposite sides of the vertex of the V track to constrain the carriages to rectilinear movement longitudinally of the tracks.

10. The camera described in claim 9, said source of power comprising a constrained elastic element engaged between said carriages and acting when released to propel them in opposite directions.

11. The camera described in claim 10, including an electromagnetic holding element and an armature therefor mounted one on each of said carriages and arranged to hold said carriages in predetermined relative positions with said elastic element constrained while electric current is supplied to said magnetic element, interruption of said electric current releasing said constrained elastic element to accelerate said carriages.

12. The camera described in claim 11, including a safety capping shutter normally held closed by spring means, an electromagnetic operator for said capping shutter arranged to open said shutter when the electromagnetic operator is energized, a source of electric current, and relay means to temporarily transfer said electric current from the electromagntic holding element to said electromagnetic shutter operator.

13. The camera described in claim 12, said relay means including an operating coil, a gaseous arc discharge tube, a charged capacitor, and means to discharge said capacitor through said tube and said operating coil to effect said transfer of electric current for a period of time sufficient for the camera to complete a scanning cycle.

14. The camera described in claim 11, including a multiple aperture scanning grid mounted on said photographic element carriage and means to fixedly support a photosensitive material beneath said carriage in position to receive light passing through said scanning grid.

15. The camera described in claim 11, including means mounted on said photographic element carriage to support a photosensitive material and a multiple aperture scanning grid fixedly supported over the path of translatory movement of said photographic element carriage to intercept portions of the light rays which would otherwise reach the photosensitive material on said carriage.

16. The camera described in claim 15, including a diffused light source mounted beneath that portion of the path of translatory movement of said photographic element carriage overlaid by said scanning grid, and means for micrometrically moving said photographic element carriage to permit viewing of developed photosensitive material on said carriage by light transmitted from said diffused light source through the developed photosensitive material and the scanning grid.

17. The camera described in claim 15, said photographic element carriage being provided with means to support a photosensitive plate having a length in the direction of scanning movement substantially greater than the length in the same direction of said scanning grid.

18. The camera described in claim 17, said constrained elastic element being provided with means which prevent its further engagement with the photographic element carriage after the leading edge of said photographic plate has passed fully beneath said scanning grid, said shock absorbing buffer being so disposed that it is not contacted by said photographic element carriage to decelerate said carriages until after the trailing edge of said photographic plate comes beneath the scanning grid, whereby said photographic element carriage is in a state of a substantially uniform rate of motion during the scanning interval in which a photographic record may be made.

No references cited.